United States Patent [19]

Parker et al.

[11] Patent Number: 5,592,281
[45] Date of Patent: Jan. 7, 1997

[54] DEVELOPMENT SCHEME FOR THREE COLOR HIGHLIGHT COLOR TRILEVEL XEROGRAPHY

[75] Inventors: Delmer G. Parker, Rochester, N.Y.; Gregory J. Kovacs, Mississauga, Canada

[73] Assignee: Xerox Corporation, Stamford, Conn.

[21] Appl. No.: 345,045

[22] Filed: Nov. 25, 1994

[51] Int. Cl.⁶ ................................................ G03G 15/01
[52] U.S. Cl. ................................ 399/156; 399/194
[58] Field of Search .................................. 355/210, 211, 355/326 R, 328; 347/119, 134, 140, 232

[56] References Cited

U.S. PATENT DOCUMENTS

| | | | |
|---|---|---|---|
| 4,078,929 | 3/1978 | Gundlach | 430/42 |
| 4,839,692 | 6/1989 | Shoji et al. | 355/211 |
| 4,868,611 | 9/1989 | Germain | 355/328 |
| 5,049,949 | 9/1991 | Parker et al. | 355/328 |
| 5,061,969 | 10/1991 | Parker et al. | 355/328 |
| 5,258,820 | 11/1993 | Tabb | 355/328 |
| 5,373,313 | 12/1994 | Kovacs | 347/119 |
| 5,444,463 | 8/1995 | Kovacs et al. | 347/118 |

*Primary Examiner*—Robert Beatty

[57] ABSTRACT

Creation of multiple color images is accomplished in a single pass utilizing a multilayered photoreceptor structure having layers which are responsive to different wavelength lasers. A composite image including three images areas is formed with substantially perfect registration. A CAD and DAD image are developed using CMB development and a second DAD image is developed using a non-interactive development system. Development of the second DAD image without developing halos around the CAD image by recharging the photoreceptor prior to development of the second DAD image.

22 Claims, 2 Drawing Sheets

DEVELOPMENT SCHEME FOR THREE COLOR HIGHLIGHT COLOR TRILEVEL XEROGRAPHY

BACKGROUND OF THE INVENTION

This invention relates generally to highlight color imaging and more particularly to a printing apparatus and method for forming one black and two color images, In the practice of conventional xerography, it is the general procedure to form electrostatic latent images on a charge retentive surface such as a photoconductive member by first uniformly charging the charge retentive surface. The charged area is selectively dissipated in accordance with a pattern of activating radiation corresponding to original images. The selective dissipation of the charge leaves a latent charge pattern on the imaging surface corresponding to the areas not exposed by radiation.

This charge pattern is made visible by developing it with toner by passing the photoreceptor past a single developer housing. The toner is generally a colored powder which adheres to the charge pattern by electrostatic attraction. The developed image is then fixed to the imaging surface or is transferred to a receiving substrate such as plain paper to which it is fixed by suitable fusing techniques.

In tri-level, highlight color imaging, unlike conventional xerography, not only are the charged (i.e., unexposed) areas developed with toner but the discharged (i.e., fully exposed) images are also developed. Thus, the charge retentive surface contains three voltage levels which correspond to two image areas and to a background voltage area. One of the image areas corresponds to non-exposed (i.e. charged) areas of the photoreceptor, as in the case of conventional xerography, while the other image areas correspond to fully exposed (i.e., discharged) areas of the photoreceptor.

The concept of tri-level, highlight color xerography is described in U.S. Pat. No. 4,078,929 issued in the name of Gundlach. The patent to Gundlach teaches the use of tri-level xerography as a means to achieve single-pass highlight color imaging. As disclosed therein the charge pattern is developed with toner particles of first and second colors. The toner particles of one of the colors are positively charged and the toner particles of the other color are negatively charged. In one embodiment, the toner particles are supplied by a developer which comprises a mixture of triboelectrically relatively positive and relatively negative carrier beads. The carrier beads support, respectively, the relatively negative and relatively positive toner particles. Such a developer is generally supplied to the charge pattern by cascading it across the imaging surface supporting the charge pattern. In another embodiment, the toner particles are presented to the charge pattern by a pair of magnetic brushes. Each brush supplies a toner of one color and one charge. In yet another embodiment, the development systems are biased to about the background voltage. Such biasing results in a developed image of improved color sharpness.

In highlight color xerography as taught by Gundlach, the xerographic contrast on the charge retentive surface or photoreceptor is divided three, rather than two, ways as is the case in conventional xerography. The photoreceptor is charged, typically to 900 v. It is exposed imagewise, such that one image corresponding to charged image areas (which are subsequently developed by Charged Area Development, i.e. CAD) remains at or near the fully charged photoreceptor potential represented by $V_{cad}$ or $V_{ddp}$. The other images are formed by discharging the photoreceptor to its residual potential, i.e. $V_{dad}$ or $V_c$ (typically 100 v) which corresponds to discharged area images that are subsequently developed by Discharged Area Development (DAD). The background areas are formed by discharging the photoreceptor to reduce its potential to halfway between the $V_{cad}$ and $V_{dad}$ potentials, (typically 500 v) and is referred to as $V_{white}$ or $V_w$. The CAD, $V_{bb}$ developer is typically biased about 100 v closer to $V_{cad}$ than $V_{white}$ is to $V_{cad}$, resulting in a $V_{bb}$ of about 600 volts, and the DAD developer system is biased about 100 v closer to $V_{dad}$ than $V_{white}$ is to $V_{dad}$ resulting in a $V_{cb}$ of about 400 volts.

As developed, the composite tri-level image initially consists of both positive and negative toners. To enable conventional corona transfer, it is necessary to first convert the entire image to the same polarity. This must be done without overcharging the toner that already has the correct polarity for transfer. If the amount of charge on the toner becomes excessive, normal transfer will be impaired and the coulomb forces may cause toner disturbances in the developed image. On the other hand, if the toner whose polarity is being reversed is not charged sufficiently its transfer efficiency will be poor and the transferred image will be unsatisfactory.

In the past few years there has been interest in extending trilevel xerography to black plus two colors. In U.S. Pat. No. 5,049,949 granted to Parker et al on Sep. 17, 1991 describes how this can be done by creating, and developing, a conventional two color trilevel image, followed by a second exposure, and development of a second DAD image of a third color. The advantage of this method is that it produces a three color image with one less exposure than by any other means. The disadvantage is that, while the first two images are perfectly registered with one another, the third is subject to the normal misregistration associated with a second exposure.

More recently, in U.S. patent applications Ser. Nos. 07/987,886, now U.S. Pat. No. 5,444,463, and 07/987,885, now U.S. Pat. No. 5,373,313, filed on Dec. 9, 1992 in the names of Gregory J. Kovacs et al and Kovacs et al, respectively and assigned to the same assignee as the instant application disclose a way to create a three color, multi-wavelength exposure, perfectly registered, trilevel latent image using a single exposure step. This technique relies on a dual beam laser where one beam has a wavelength λ1, and the other λ2, and where both are focussed adjacent to each other on the photoreceptor. The photoreceptor consists of two photosensitive layers of approximately equal dielectric thickness, one layer of which responds to λ1, but not λ2, and the other to λ2, but not λ1.

FIGS. 1 and 2 illustrate how the multiwavelength exposure method works. Here, the upper portion shows the voltage profile of the two layered photoreceptor after it has been exposed by λ1 or λ2, λ1+λ2 combined, or neither. Immediately below the voltage profile is the corresponding cross section of a two layer photoreceptor where the shaded areas denote portions that remain charged after exposure.

Wherever only light of wavelength λ2 strikes the photoreceptor, the top layer, for example, of photoreceptor is fully discharged leaving the photoreceptor surface potential at $-V_{0/2}$. This is the background reference ($V_{white}$) component of the trilevel latent image. In regions where both beams are off, the photoreceptor remains charged to $V_0$ forming the first color, Charged Area Developed (CAD) portion of the three color trilevel latent image. The second color, Discharge Area Developed (DAD) latent image is formed wherever both the upper and lower layers of photoreceptor are discharged to $V_{residual}$ by both beams acting in unison. The third color, Discharge Area Developed (DAD) latent image, is formed by a λ1 imagewise exposure which leaves the photoreceptor charged to ~$V_{0/2}$.

At this point, the photoreceptor voltage profile contains a first color CAD image and a second color DAD image above, and below respectively, the reference voltage $V_{white}$, but because the third color DAD latent image is also at the $V_{white}$, it is electrostatically indistinguishable from background to the first and second development systems. As shown in FIG. 2, after the first color CAD and second color DAD images have been developed, the photoreceptor is then flood exposed by light of wavelength λ2 or some other suitable wavelength which will discharge layer 2 but not layer 1. This additional exposure has no effect on the potential in the background regions that have been previously exposed by λ2, but does complete the discharge in regions that were exposed by λ1. This makes the third color DAD image electrostatically visible or distinguishable for development at the second DAD station. The toner used to develop the CAD and first DAD images are opaque to light at the wavelength of the flood exposure in order to avoid developing additional voltage offsets.

Although the CAD image and the first DAD image can be developed by conventional trilevel Conductive Magnetic Brush (CMB) techniques, development of the second DAD image presents a problem. CMB relies on contact development which does not simply develop to neutralization and stop, but rather, reaches a state of equilibrium in which the deposition rate and scavenging rate come into balance. Because the toners in both DAD development stations have a common polarity, a third contact development step will interact with the DAD image already developed and cause a hue shift. Scavenged toner will also color contaminate the third developer, and eventually produce a hue shift in the second DAD image. Clearly, contact development is unacceptable at the third development station.

Unfortunately, non-contact, powder cloud-like development systems typically respond to electrostatic edges of ~30 volts or more. In addition, CMB development systems require cleaning fields on the order of ~100 volts to suppress spurious background development. Hence, even if the CMB development completely neutralized the development field with respect to the bias, the developed image will still be offset from background ~100 volts. The shaded areas in FIG. 3 denote the neutralized CAD and first DAD image after development. Here, assuming that the third non-contact development station is biased to also produce a ~100 volt cleaning field, the voltage offset at the edges between the CAD, and second DAD image would be ~200 volts, and therefore halos of the third color would be developed around the CAD image.

BRIEF SUMMARY OF THE INVENTION

According to the present invention, a three color trilevel electrostatic image is developed without the undesirable interactions noted above which result in halos around the CAD image. The CAD and first DAD image are developed by conventional trilevel CMB development means. Next, one or more field sensitive charging devices are used to uniformly recharge the photoreceptor to the reference potential, $V_{white}$ (~$V_0/2$), after which, a third color image is made electrostatically visible and developed with a non-contact development system. The developed composite, three color image is then converted to a common polarity by a pretransfer charging step and transferred to paper.

DETAILED DESCRIPTION OF THE PREFERRED EMBODIMENT OF THE INVENTION

Figure 4:
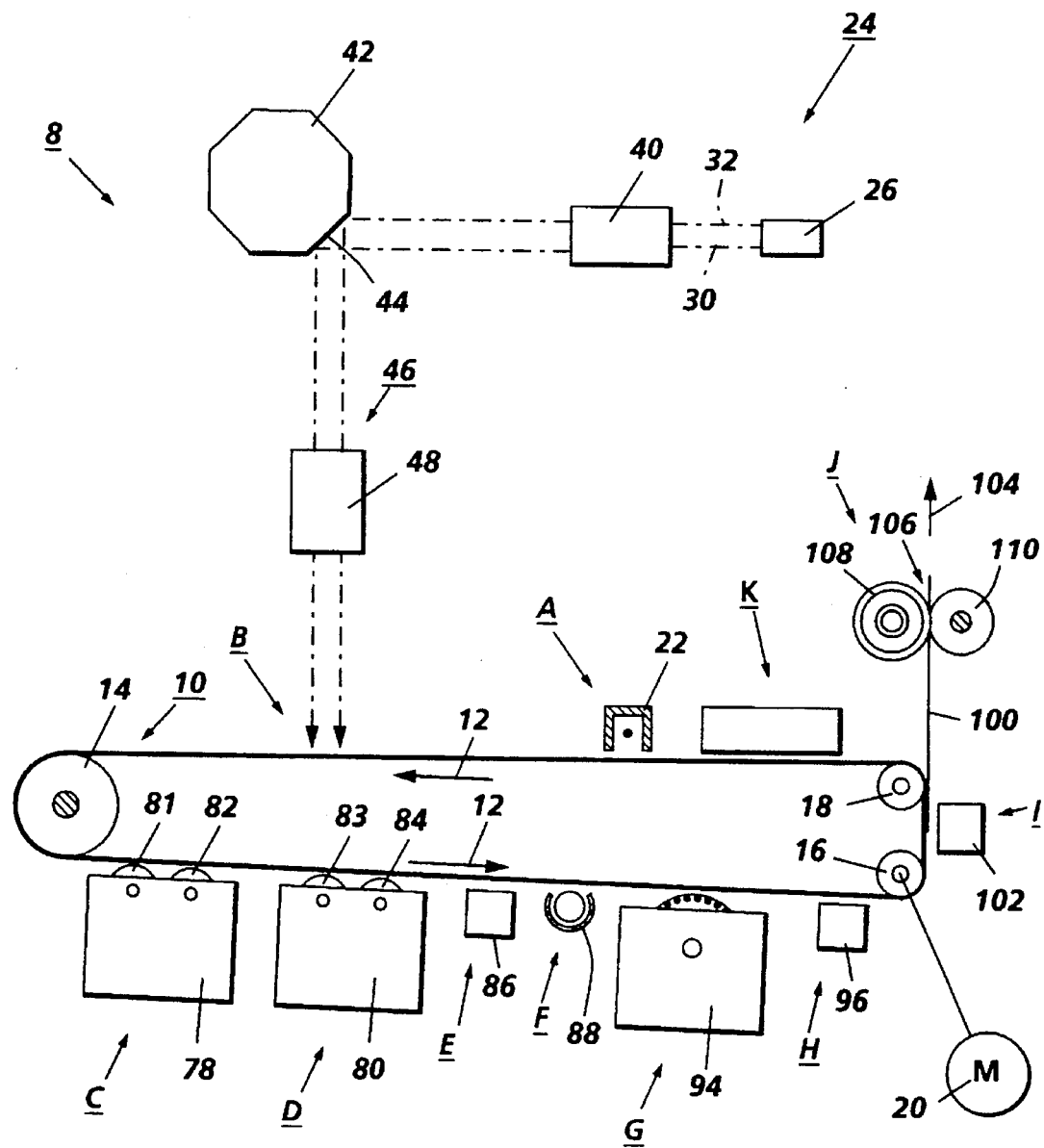
FIG. 4 is a schematic illustration of a xerographic processing engine incorporating the invention.

As shown in FIG. 4, a xerographic processor 8 incorporating the invention may utilize a charge retentive member in the form of a photoconductive belt structure 10 comprising photoconductive surface and an electrically conductive substrate and mounted for movement past a charging station A, a first exposure station B, a first development station C, a second development station D, a recharging station E, a second exposure station F, a third development station G, a pretransfer charging station H, a transfer station I, a fusing station J and a cleaning station K.

Belt 10 moves in the direction of arrow 12 to advance successive portions thereof sequentially through the various processing stations disposed about the path of movement thereof. Belt 10 is entrained about a plurality of rollers 14, 16 and 18. The roller 16 may be used as a drive roller and the roller 14 may be used to provide suitable tensioning of the photoreceptor belt 10. Motor 20 rotates roller 16 to advance belt 10 in the direction of arrow 12. Roller 16 is coupled to motor 20 by suitable means such as a belt drive, not shown.

As can be seen by further reference to FIG. 4, initially successive portions of belt 10 pass through charging station A. At charging station A, a corona discharge device such as a scorotron, corotron or dicorotron indicated generally by the reference numeral 22, charges the belt 10 to a selectively high uniform positive or negative potential, $V_0$. Any suitable control, well known in the art, may be employed for controlling the corona discharge device 22.

Next, the uniformly charged portions of the photoreceptor surface are advanced through exposure station B. At exposure station B, the uniformly charged photoreceptor or charge retentive surface 10 is exposed to a laser based output scanning device 24 which effects selective discharge of the photoreceptor belt structure 10.

By further reference to FIG. 4, it can be seen that the raster output scanner 24 can use a dual wavelength hybrid or monolithically integrated laser semiconductor structure 26 consisting of a 670 nm wavelength laser emitter such as a semiconductor structure of AlGaInP/GaAs and a 830 nm laser emitter such as a semiconductor structure of AlGaAs/GaAs, both laser emitter structures being known to those of ordinary skill in the art.

The different wavelength beams 30 and 32 must be scanned over on top of each other on the photoreceptor to maintain registration and avoid misalignment. The tangential offset is given an upper limit of 300 μm since tangential offset does not introduce scan line bow. The effect of tangential offset is to require delay in the electronic modulation signals to one of the dual beams relative to the other since one beam lags the other during scanning across the photoreceptor. Sagittal offset can also be used so that the beams are simultaneously scanning adjacent lines. On each successive scan the line previously scanned by the forward beam is overscanned by the trailing beam. Appropriate image processing algorithms produce the desired image. The dual wavelength laser structure provides a substantially common spatial origin for each beam. Each beam is independently modulated so that it exposes the photoreceptor structure in accordance with a respective color image.

The two laser beams 30 and 32 emitted from the laser structure 26 are input to a conventional beam input optical system 40 which collimates, conditions and focuses the beams onto optical paths such that they impinge on a rotating polygon mirror 42 having a plurality of facets 44. As the polygon mirror rotates, the facets cause the reflected beams to deflect repeatedly in the direction indicated by the arrow 46. The deflected laser beams are input to a single set of imaging and correction optics 48, which corrects for errors such as polygon angle error and wobble and focuses the beams onto the photoreceptor belt structure 10.

The photoreceptor belt structure 10 (FIG. 2) comprises a conductive substrate 52, a first combination transport/generator layer structure 54 and a second transport/generator layer structure 56. The substrate can be opaque, translucent, semitransparent, or transparent, and can be of any suitable conductive material, including copper, brass, nickel, zinc, chromium, stainless steel, conductive plastics and rubbers, aluminum, semitransparent aluminum, steel, cadmium, silver, gold, paper rendered conductive by the inclusion of a suitable material therein or through conditioning in a humid atmosphere to ensure the presence of sufficient water content to render the material conductive, indium, tin, metal oxides, including tin oxide and indium tin oxide, and the like. In addition, the substrate can comprise an insulative layer with a conductive coating, such as vacuum-deposited metallized plastic, such as titanized or aluminized Mylar™ polyester, wherein the metallized surface is in contact with the bottom photoreceptor layer or any other layer such as a charge injection blocking or adhesive layer situated between the substrate and the bottom photoreceptor layer. The substrate has any effective thickness, typically from about 6 to about 250 microns, and preferably from about 50 to about 200 microns, although the thickness can be outside of this range. The photoreceptor layers themselves may consist of two or more sublayers. Each photoreceptor layer in FIG. 2 consists of two sublayers, i.e. a charge generation layer and a charge transport layer.

The layer structure 54 may comprise a titanyl phthalocyanine (TiOPc) generator layer of approximately 0.1 to 1 μm thickness and a transport layer of N,N'-diphenyl-N,N'-bis(3"-methylphenyl)-(1,1'-biphenyl)-4,4'-diamine in polycarbonate (TPD) which is hole transporting and approximately 15 μm thick.

The layer structure 56 may comprise a benzimidazole perylene (BZP) generator layer of approximately 0.1 to 1 μm thickness, a transport layer of TPD in polycarbonate which is hole transporting and approximately 15 μm thick. The TiOPc generator layer should be thin enough to maintain low dark decay and the BZP generator layer should be thick enough to be opaque to the wavelength used to discharge it. BZP is known to be coatable to opaque thicknesses while maintaining low dark decay.

In this illustrative embodiment, examples of suitable red light sensitive pigments include perylene pigments such as dibromoanthranthrone, crystalline trigonal selenium, beta-metal free phthalocyanine, azo pigments, and the like, as well as mixtures thereof. Examples of suitable infrared sensitive pigments include X-metal free phthalocyanine, metal phthalocyanines such as vanadyl phthalocyanine, chloroindium phthalocyanine, chloroaluminum phthalocyanine, copper phthalocyanine, magnesium phthalocyanine, and the like, squaraines, such as hydroxy squaraine, and the like as well as mixtures thereof. Examples of suitable charge transport materials include diamine molecules, pyrazoline molecules, substituted fluorene molecules, oxadiazole molecules, hydrazone molecules, carbazole phenyl hydrazone molecules, vinylaromatic polymers, oxadiazole derivatives, tri-substituted methanes, and 9-fluorenylidene methane derivatives.

Figure 1:
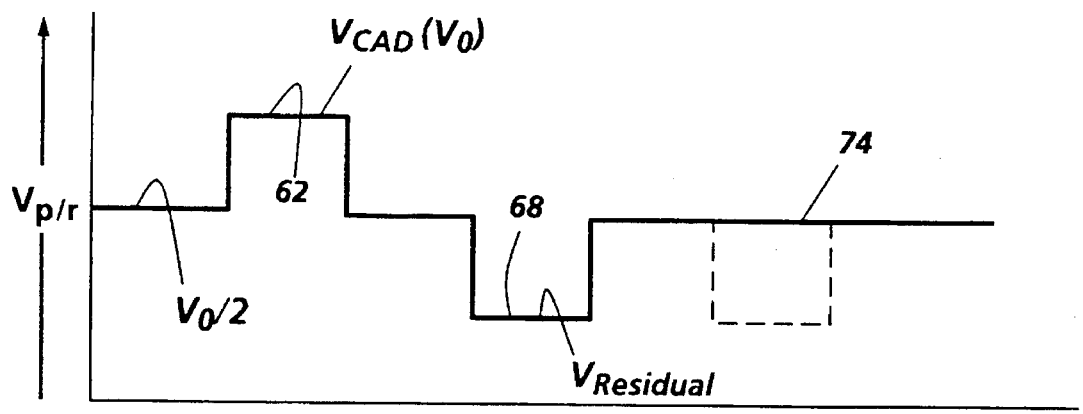
FIG. 1 depicts the voltage profile of a two-layer photoreceptor after it has been subjected to two exposures at different wavelengths.
Figure 2:
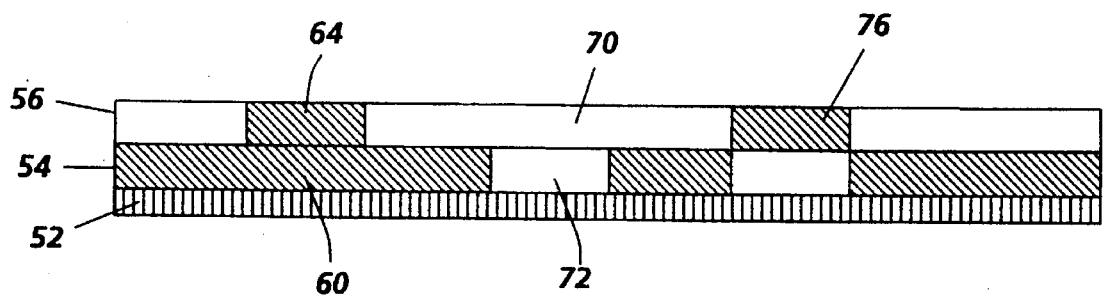
FIG. 2 is cross-sectional view depicting charge distribution on the two-layer photoreceptor corresponding to the voltage profile of FIG. 1.

FIGS. 1 and 2 illustrate how the multiwavelength exposure method works. Here, FIG. 1 shows the voltage profile of the multilayered photoreceptor belt structure after it has been exposed to beams 30 and 32. In operation, the belt may be exposed to beam 30 alone, beam 32 alone or beams 30 and 32 in combination. FIG. 2 shows the multilayered belt structure 10 depicting the state thereof corresponding to the voltage profile of FIG. 1.

Wherever only beam 32 strikes the photoreceptor structure, the top layer 56 is fully discharged leaving the photoreceptor surface potential at $\sim V_{0/2}$. This is due to the presence of the charge indicated by reference character 60 on the layer 54. This is the background reference ($V_{white}$) component of a trilevel latent image. In an area 62 (FIG. 1) of the photoreceptor where neither of the beams 30 and 32 are turned on, the photoreceptor remains charged to $V_0$ ($V_{CAD}$) forming the first color, Charged Area Developed (CAD) portion of the three color trilevel latent image. The CAD image is due to the presence of the charge 60 in the layer 54 together with a charged area 64 in the layer 56.

The first Discharge Area Developed (DAD) latent image is formed where both of the layers 54 and 56 of the photoreceptor are discharged to $V_{residual}$ by both beams 30 and 32 acting in unison. Area 68 of the photoreceptor contains the first DAD image. The first DAD image results from the substantial absence of charge in areas 70 and 72 in layers 56 and 54, respectively.

The third color, Discharge Area Developed (DAD) latent image, is formed by imagewise exposure with beam 30 which leaves the photoreceptor charged to $\sim V_{0/2}$ as indicated by reference character 74 in FIG. 1 and reference character 76 in FIG. 2. The second DAD image 74 is due to the presence of charge 76 on the layer 56.

At this point, the photoreceptor voltage profile contains a first color CAD image and a second color DAD image, one above and the other below respectively, the reference voltage $V_{white}$ ($V_{0/2}$), but because the third color DAD latent image is also at $V_{white}$, it is electrostatically indistinguishable from background to the first and second development systems. The CAD and first DAD images are developed using Conductive Magnetic Brush (CMB) development structures 78 and 80. Magnetic brush rollers 81 and 82 form a part of the structure 78 and serve to deposit toner particles on the CAD image on the photoreceptor 10. The developer structures are electrically biased in accordance with conventional trilevel biasing schemes. The developer structure 80 contains magnetic brush rollers 83 and 84 for depositing toner particles on the first DAD image.

Figure 3:
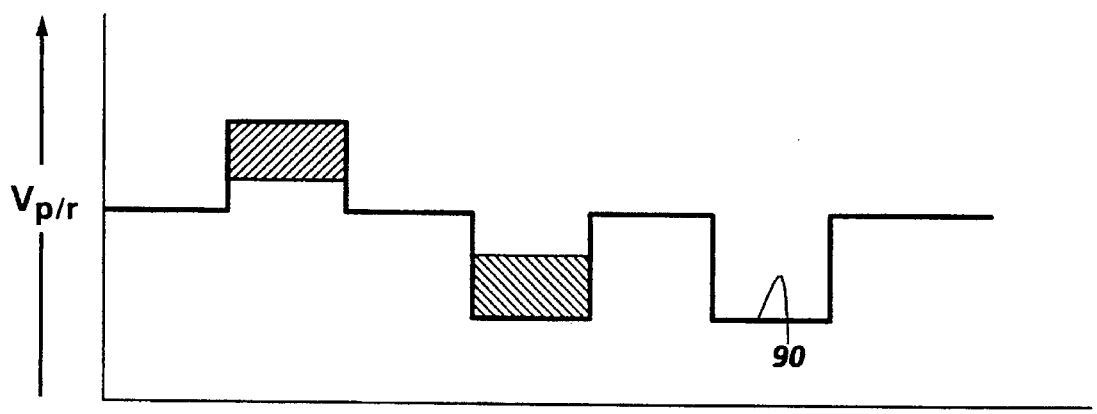
FIG. 3 depicts the neutralized CAD and first DAD image after development.

After the CAD and first color DAD images have been developed, the photoreceptor is then uniformly recharged to the reference potential, $V_{white}$ ($\sim V_0/2$). A field sensitive corona discharge device such as a dicorotron 86 is provided. The recharging step is followed by flood exposing the second DAD image, flood exposure being accomplished using a light source 88 having the same wavelength as beam 32 or some other suitable wavelength which will discharge layer 56 but not layer 54. The flood exposure has no effect on the potential in the background regions that have been previously exposed by beam 32, but does complete the discharge in regions that were exposed with beam 30. This makes the third color DAD image 90 (See FIG. 3) electrostatically visible for development at the second DAD station. The second DAD image is then developed with a single component non-contact or non-interactive development system 94.

The toner used to develop the CAD and first DAD images are opaque to light at the wavelength of the flood exposure in order to avoid developing a voltage offset after the recharge and flood exposure.

Because the composite image developed on the photoreceptor consists of both positive and negative toner, a typically positive pretransfer corona discharge member 96 disposed at pretransfer charging station H is provided to condition the toner for effective transfer to a substrate using positive corona discharge. The pretransfer corona discharge member is preferably an AC corona device biased with a DC voltage to operate in a field sensitive mode and to perform tri-level xerography pretransfer charging in a way that selectively adds more charge (or at least comparable charge) to the part of composite tri-level image that must have its polarity reversed compared to elsewhere. This charge discrimination is enhanced by discharging the photoreceptor carrying the composite developed latent image with light (not shown) before the pretransfer charging begins. Furthermore, flooding the photoreceptor with light coincident with the pretransfer charging minimizes the tendency to overcharge portions of the image which are already at the correct polarity.

A sheet of support material 100 is moved into contact with the toner image at transfer station I. The sheet of support material is advanced to transfer station I by conventional sheet feeding apparatus, not shown. Preferably, the sheet feeding apparatus includes a feed roll contacting the uppermost sheet of a stack copy sheets. Feed rolls rotate so as to advance the uppermost sheet from stack into a chute which directs the advancing sheet of support material into contact with photoconductive surface of belt 10 in a timed sequence so that the toner powder image developed thereon contacts the advancing sheet of support material at transfer station I.

Transfer station I includes a corona generating device 102 which sprays ions of a suitable polarity onto the backside of sheet 100. This attracts the charged toner powder images from the belt 10 to sheet 100. After transfer, the sheet continues to move, in the direction of arrow 104, onto a conveyor (not shown) which advances the sheet to fusing station J.

Fusing station J includes a fuser assembly, indicated generally by the reference numeral 106, which permanently affixes the transferred powder image to sheet 100. Preferably, fuser assembly 106 comprises a heated fuser roller 108 and a backup roller 110. Sheet 100 passes between fuser roller 108 and backup roller 110 with the toner powder image contacting fuser roller 108. In this manner, the toner powder image is permanently affixed to sheet 100. After fusing, a chute, not shown, guides the advancing sheet 100 to a catch tray, also not shown, for subsequent removal from the printing machine by the operator.

After the sheet of support material is separated from photoconductive surface of belt 10, the residual toner particles carried by the non-image areas on the photoconductive surface are removed therefrom. These particles are removed at cleaning station K. A magnetic brush cleaner housing is disposed at the cleaner station K. The cleaner apparatus comprises a conventional magnetic brush roll structure for causing carrier particles in the cleaner housing to form a brush-like orientation relative to the roll structure and the charge retentive surface. It also includes a pair of detoning rolls for removing the residual toner from the brush. Other cleaning systems, such as fur brush or blade, are also suitable.

Subsequent to cleaning, a discharge lamp (not shown) floods the photoconductive surface with light to dissipate any residual electrostatic charge remaining prior to the charging thereof for the successive imaging cycle.

What is claimed is:

1. A method of creating toner images on a charge retentive surface, said method including the steps of:

uniformly charging said charge retentive surface;

simultaneously forming a trilevel image comprising a CAD and a DAD image and a background area intermediate thereof;

forming another DAD image simultaneously with the formation of said CAD and DAD images wherein said another image is electrostatically indistinguishable from said background area whereby development thereof is precluded when said CAD and DAD images are developed;

developing said CAD and DAD images forming said trilevel image;

uniformly recharging said charge retentive surface;

rendering said another DAD image electrostatically distinguishable from said background area; and developing said another DAD image.

2. The method according to claim 1 wherein said step of developing said CAD and DAD images is effected using CMB development.

3. The method according to claim 2 wherein said step of developing said another DAD image is effected using a non-interactive development system.

4. The method according to claim 3 wherein said step of charging is effected on a photoreceptor having first and second layers responsive to different wavelengths.

5. The method according to claim 4 wherein said steps of forming are effected using a laser structure adapted to emit beams at two different wavelengths corresponding to the wavelengths to which said first and second layers are responsive.

6. The method according to claim 5 wherein said step of uniformly recharging is effected using a field sensitive corona discharge device.

7. The method according to claim 6 wherein said step of rendering is effected using a flood illumination source.

8. The method according to claim 7 wherein said step of rendering is effected using an illumination source which operates at the same wavelength as a beam which forms said another DAD image.

9. The method according to claim 8 wherein said step of developing said CAD and DAD images is effected using toner which is opaque to light at the wavelength of said illumination source.

10. The method according to claim 9 wherein all of said images are formed in a single pass.

11. Apparatus for creating toner images on a charge retentive surface, said apparatus comprising:

means for uniformly charging said charge retentive surface;

means for simultaneously forming a trilevel image comprising a CAD and a DAD image and a background area intermediate thereof;

means for forming another DAD image simultaneously with the formation of said CAD and DAD images wherein said another image is electrostatically indistinguishable from said background area whereby development thereof is precluded when said CAD and DAD images are developed;

means for developing said CAD and DAD images forming said trilevel image;

means for uniformly recharging said charge retentive surface;

means for rendering said another DAD image electrostatically distinguishable from said background area; and means for developing said another DAD image.

12. Apparatus according to claim 11 wherein said means for developing said CAD and DAD images is effected using CMB development.

13. Apparatus according to claim 12 wherein said means for developing said another DAD image is effected using a non-interactive development system.

14. Apparatus according to claim 13 wherein said means for charging is effected on a photoreceptor having first and second layers responsive to different wavelengths.

15. Apparatus according to claim 14 wherein said means for forming is effected using a laser structure adapted to emit beams at two different wavelengths corresponding to the wavelengths to which said first and second layers are responsive.

16. Apparatus according to claim 15 wherein said means for uniformly recharging is effected using a field sensitive corona discharge device.

17. Apparatus according to claim 16 wherein said means for rendering is effected using a flood illumination source.

18. Apparatus according to claim 17 wherein means for rendering is effected using an illumination source which operates at the same wavelength as a beam which forms said another DAD image.

19. Apparatus according to claim 18 wherein said means for developing said CAD and DAD images is effected using toner which is opaque to light at the wavelength of said illumination source.

20. Apparatus according to claim 19 wherein all of said images are formed in a single pass.

21. The method according to claim 7 wherein said step of rendering is effected using an illumination source which operates at a wavelength which has the same photodischarge effect as the beam which forms said DAD image.

22. Apparatus according to claim 17 wherein means for rendering is effected using an illumination source which operates at a wavelength which has the same photodischarge effect as the beam which forms said DAD image.

* * * * *